Nov. 15, 1966   J. CADIOU   3,285,371
SPOT TYPE DISC BRAKES

Filed Jan. 6, 1965   3 Sheets-Sheet 1

INVENTOR
Jean Cadiou
BY
Stevens, Davis, Miller & Mosher
ATTORNEYS

Nov. 15, 1966 — J. CADIOU — 3,285,371
SPOT TYPE DISC BRAKES
Filed Jan. 6, 1965 — 3 Sheets-Sheet 2

INVENTOR
Jean Cadiou
BY
Stevens, Davis, Miller & Mosher
ATTORNEYS

Nov. 15, 1966

J. CADIOU 3,285,371

SPAT TYPE DISC BRAKES

Filed Jan. 6, 1965

INVENTOR
Jean Cadiou
BY
Stevens, Davis, Miller & Mosher
ATTORNEYS

United States Patent Office 3,285,371
Patented Nov. 15, 1966

3,285,371
SPOT TYPE DISC BRAKES
Jean Cadiou, Paris, France, assignor to Societe Anonyme Andre Citroën, Paris, France, a society of France
Filed Jan. 6, 1965, Ser. No. 423,697
Claims priority, application France, Jan. 13, 1964, 960,159
6 Claims. (Cl. 188—73)

The present invention relates to disc brakes in particular for automobile vehicles, of the kind including a disc driven in rotation by a shaft to be braked, a brake frame disposed astride a portion of the periphery of the disc, two friction pads mounted on said frame and located on either side, respectively, of the disc and at least one of which can slide with respect to said frame in a direction parallel to said shaft, and means for displacing the slidable friction pad or pads with respect to the frame in a direction such that the disc is tightly caught between the two friction pads. The invention is more especially concerned with brakes of this kind wherein the disc and the frame are both fixed in the direction parallel to the shaft and both of the friction pads are movable and actuated by said means, respectively.

The object of the present invention is to provide a brake of this kind wherein the friction pads can be readily changed when necessary.

According to the present invention, the brake comprises, on at least one of the fraction pads and/or on a plate carrying said friction pad rigidly fixed thereto, two cylindrical bearing surfaces having a common axis parallel to the axis of the above mentioned shaft, said cylindrical surfaces having circular arcs as directrices, and the frame is provided, on the one hand, with cylindrical holding surfaces intended to cooperate with the above mentioned bearing surfaces, respectively, and having the same radii as them, so that the fraction pad that is considered can pivot about said common axis through a limited angle, and, on the other hand, with at least one abutment adapted normally to prevent this pivoting movement, this abutment being retractable in such manner that, once it has been retracted, it permits said pivoting movement until one of the bearing surfaces of the friction pad, and/or of the supporting plate thereof, escapes from the holding surface of the frame and thus permits of removing the fraction pad in a direction parallel to the corresponding face of the disc away from the other holding surface of the frame.

Preferred embodiments of the present invention will be hereinafter described with reference to the appended drawings, given merely by way of example, and in which.

Figure 1:
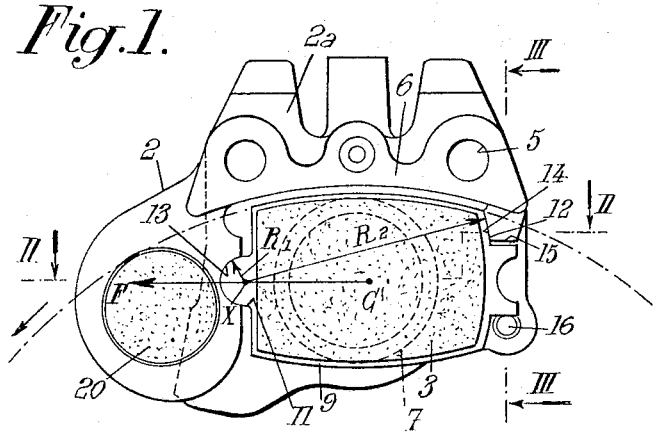
FIG. 1 is a vertical section of the line I-I of FIG. 2 of a brake made according to a first embodiment of the invention.

A brake according to the present invention comprises the following elements:

A disc 1 driven by a shaft (not shown) to be braked;
A brake frame 2 disposed astride a portion of the periphery of disc 1;
Two friction pads 3 and 4 (4 being visible only on FIG. 6) mounted respectively on opposite sides of disc 1 and carried by frame 2 in such manner that at least one of them can slide with respect to said frame in a direction parallel to the shaft of disc 1; and
Means for moving the movable friction pad or pads with respect to frame 2 in the direction for which disc 1 is tightly held between pads 3 and 4.

In what follows it will be supposed that disc 1 and frame 2 are both fixed in a direction parallel to the shaft of the disc and that the friction pads are both movable and actuated separately by the above mentioned means.

Frame 2 consists of two elements 2a and 2b joining each other approximately in the mean place of disc 1 and assembled together by means of bolts (not shown) extending through holes 5 provided in said elements 2a and 2b on the outside of the outline of disc 1. Preferably, frame 2 is of C-shaped profile so that the middle portion of the C profile makes it impossible to have access to the friction pads in the radial direction of the disc. In particular, according to the embodiment shown by the drawings, where the frame consists of two elements 2a and 2b, the portions 6 through which said elements are fitted against each other and the inner surfaces of which are close to the periphery of disk 1 make it impossible to reach the friction pads.

In order to actuate the friction pads, use can be made of hydraulic (or pneumatic) means consisting of pistons 7 slidable in cylinders 8, said cylinders being provided in frame 2 or fixed thereto and being for instance fed simultaneously with fluid under pressure. Said hydraulic (or pneumatic) means may be completed or replaced by mechanical means (not shown).

Now, according to the invention, there is provided on friction pads 3 and 4 or preferably, as shown by the drawings, on rigid plates 9 and 10 (10 being visible only on FIG. 6) which carry said friction pads, respectively, a pair of cylindrical bearing surfaces having a common axis X parallel to the axis of the shaft of disc 1 and having circular arcs as directrices, and there is provided, in frame 2, on the one hand, cylindrical holding surfaces intended to cooperate with said bearing surfaces, respectively, in such manner that said friction pads can be pivoted about axis Z through a limited angle, and on the other hand, at least one abutment normally preventing this pivoting movement.

Figure 3:
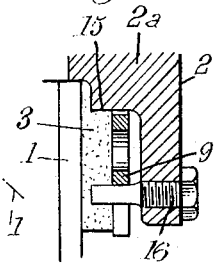
FIG. 3 is a vertical half section on the line III-III of FIG. 1.
Figure 2:
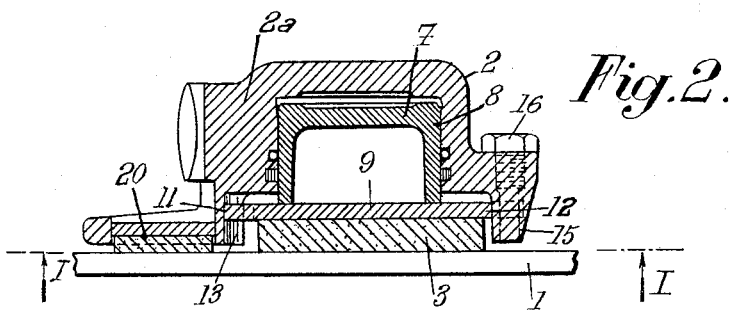
FIG. 2 is a horizontal half section on the line II-II of FIG. 1.
Figure 4:
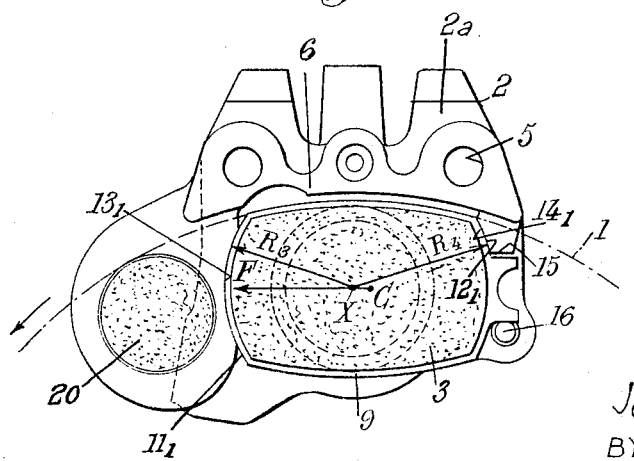
FIG. 4 is a view, similar to FIG. 1, of a brake made according to a second embodiment of the invention.
Figure 5:
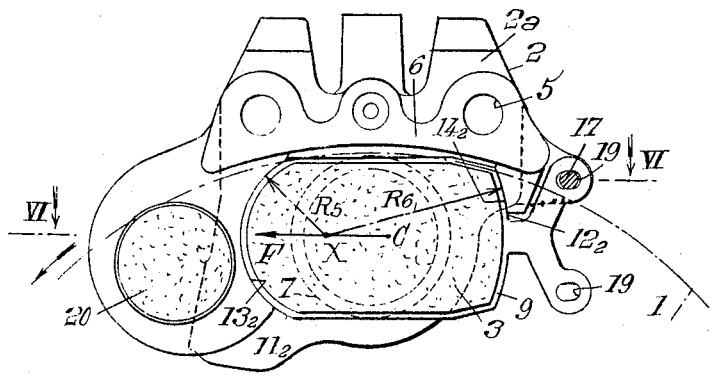
FIG. 5 is a vertical sectional view, on the line V-V of FIG. 6, of a third embodiment of the invention.
Figure 6:
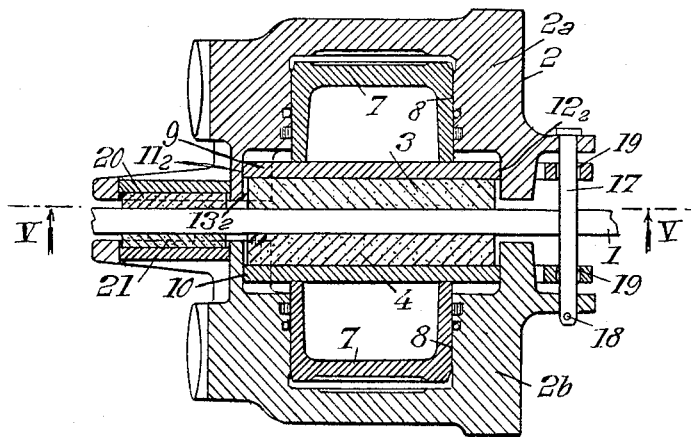
FIG. 6 is a horizontal sectional view, on the line VI-VI of FIG. 5.

According to a first arrangement (FIGS. 1 to 6 inclusive), the bearing surfaces, designated by 11 and 12 in the embodiment of FIGS. 1-3, by $11_1$ and $12_1$ in the embodiment of FIG. 4, and by $11_2$ and $12_2$ in the embodiment of FIGS. 5-6, are convex and the holding surfaces, designated by 13 and 14 in the embodiment of FIGS. 1-3, by $13_1$ and $14_1$ in the embodiment of FIG. 4, and by $13_2$ and $14_2$ in the embodiment of FIGS. 5-6, are concave.

If C is the center of the surface of friction pads 3 and 4 and F the force to which each of said pads is subjected during braking, which force passes through center C, it is advantageous to have axis X and force F intersecting each other or at least passing at a small distance from each other. Advantageously, as shown by FIGS. 1, 4, 5 and 7, center C is offset with respect to the center of the corresponding piston 7 in the direction opposed to that of force F.

In these embodiments, as shown for instance by FIG. 1, in normal position, surfaces 11 and 13 located on one side of a friction pad are intersected by the plane parallel to the axis of the brake and in which force F is located, whereas surfaces 12 and 14 located on the other side of the friction pad are located entirely on one side of said plane and more particularly on the side of this plane which is at the greater distance from the axis of disc 1.

In this case, when the brake disc is intended to turn more frequently in the direction indicated by the arrows of FIGS. 1, 4, 5 and 7 (forward running of the vehicle in this embodiment) surfaces 11 and 13, $11_1$ and $13_1$, $11_2$ and $13_2$, are located on the side which normally receives the reactions due to braking.

According to the embodiment of FIGS. 1 to 3, the radius $R_1$ of surfaces 11 and 13 is considerably smaller than the radius $R_2$ of surfaces 12 and 14.

According to the embodiments of FIGS. 4 and 5 the radii $R_3$ and $R_5$ of surfaces $11_1$ and $13_1$ are of the same order of magnitude as the radii $R_4$ and $R_6$ of surfaces $12_1$ and $14_1$.

According to the embodiment of FIGS. 1 to 3 and to that of FIG. 4, in order to prevent pivoting of the pads about axis X, there is provided, on one side, a fixed abutment 15 and, on the other side, a retractable abutment consisting, in said embodiments, of a screw 16 engaged in the element $2a$ or $2b$ of frame 2, parallelly to the axis of disc 1.

According to the embodiment of FIGS. 5 and 6, there is provided a single retractable abutment to prevent pad 3 or 4 from pivoting in both directions, this abutment consisting of a rod 17 parallel to the axis of disc 1 and extending between the elements $2a$ and $2b$ of frame 2, where it may be fixed by a pin 18. This rod 17 extends through holes 19 provided in a projecting portion of plates 9 and 10.

Figure 7:
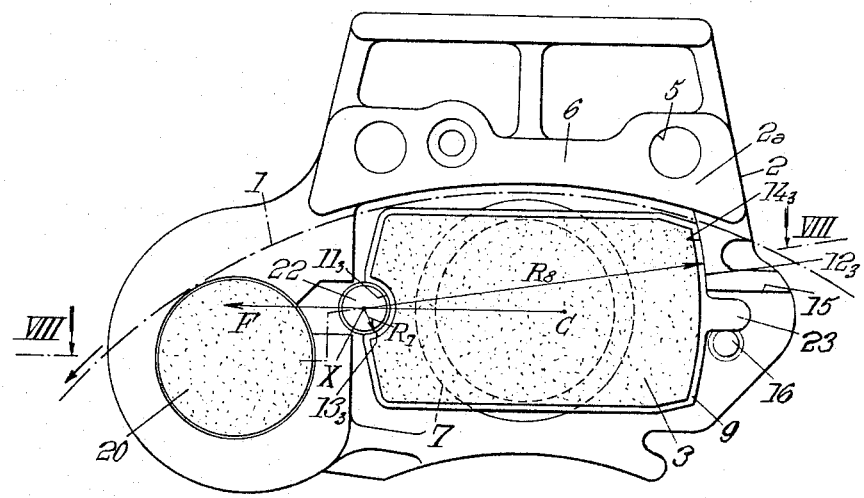
FIG. 7 is a vertical sectional view, on the line VII-VII of FIG. 8, of a fourth embodiment of the invention.
Figure 8:
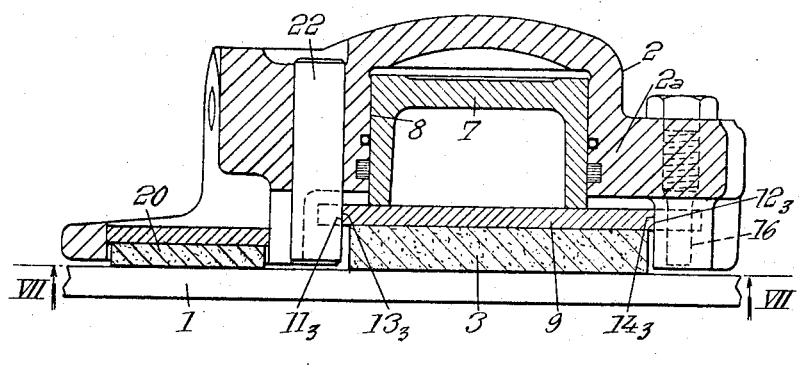
FIG. 8 is a horizontal half section, on the line VIII-VIII of FIG. 7.

According to a second solution, illustrated by FIGS. 7 and 8, the bearing surface $11_3$ is concave and the bearing surface $12_3$ is convex, and the holding surfaces $13_3$ and $14_3$ have corresponding shapes. Each holding surface $13_3$ may belong to a rod 22 passing through element $2a$ or $2b$ and projecting on the inside of frame 2 to a point close to the corresponding lateral surface of disc 1. Radius $R_7$ common to surfaces $11_3$ and $13_3$ is considerably smaller than radius $R_8$ common to surfaces $12_3$ and $14_3$. In order to prevent pivoting of the pads about axis X, two abutments are provided on opposite sides respectively of a tongue 23 belonging to plate 9 or 10, to wit on the one hand a fixed abutment 15 and on the other hand a retractable abutment consisting of a screw 16 engaged in the element $2a$ or $2b$ of frame 2 and parallel to the axis of disc 1.

Whatever be the embodiment that is chosen, plate 9 is advantageously given a shape symmetrical with respect to the plane passing through axis X and center C, so that the same type of plate can be used on both sides of disc 1.

Finally the system may include an auxiliary mechanical brake (not shown) adapted to apply, against disc 1, linings 20 and 21 slidably mounted in frame 2.

The operation of the brake and replacement of the pads is practically the same for all embodiments. It will be described for the construction of FIGS. 1–3 as follows:

When pads 3 and 4 are pressed by their respective pistons 7 against the opposed faces of disc 1, their plates 9 and 10 slide in contact with holding surfaces 13 and 14. The braking reaction is transmitted generally to the holding surfaces 13 (braking when the vehicle is running forward) or exceptionally to holding surfaces 14 (when the vehicle is running backward).

In the first case, the braking reaction is entirely supported by holding surfaces 13 without giving rise to a radial component.

In the second case, the braking reaction is supported by holding surfaces 14 and produces only a negligible radial braking component. It will therefore be understood that retractable abutments 16, 17 are not subjected to the braking reactions and merely serve to keep pads 3 and 4 in position.

When pads 3 and 4 are worn, abutment 16 (FIGS. 1–3, FIG. 4, FIGS. 7–8) or 17 (FIGE. 5–6) in retracted and plates 9 and 10 are pivoted about their axis X by an amount just sufficient for enabling the bearing surface 12 of the plate to escape from the holding surface 14 of the frame. It is then possible to remove the whole of the plate and of the pad away from holding surface 13 in a direction approximately tangential to disc 1. It is then possible to fit in position a new plate together with its friction pad. Thus the replacement of worn pads is a very easy operation. In view of the fact that abutments 16 and 17 have no considerable stresses to support, they do not risk being deformed during their operation, and their unscrewing or removal involves no difficulty.

It will be understood that, with such a disc brake, the pads are functionally secured to the stirrup exclusively and are held in utilization position by means having no functional action. Likewise the juxtaposed auxiliary linings are also secured to an extension of the stirrup, but without structural reinforcement thereof, the mechanical control ensuring by itself the reaction to the braking effort.

Due to the fact that the radii, such as $R_1$ and $R_2$, $R_3$ and $R_4$, $R_5$ and $R_6$, $R_7$ and $R_8$, pass through the same center X, the pads are safely maintained in the tangential direction even if the abutments such as 15 and 16 or 17 permit a certain freedom of movement of said pads about the common center X.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A disc brake for a vehicle which comprises, in combination, a disc rotatable about an axis perpendicular thereto and passing through the center thereof, a stationary brake frame disposed astride a portion of the periphery of said disc, two friction members parallel to said disc and located on opposed sides thereof opposite each other, said friction members being carried by said brake frame and at least one of them being slidable with respect to said frame parallelly to said axis to permit movements of said friction members toward each other parallel to said axis to clamp said disc tightly between them, each of said friction members including two cylindrical bearing surfaces the generatrices of which are parallel to said axis and the respective directrices of which are circular arcs having a common center and transverse to the periphery of said disc, said frame including cylindrical holding surfaces of the same shape as said bearing surfaces, respectively, and adapted to cooperate therewith, said frame further including at least one retractable abutment adapted to prevent pivoting of said friction members about an axis parallel to said disc axis and passing through said last mentioned center, in such manner that, once said abutment is retracted, said friction members can be disengaged from said frame by a pivoting about said second mentioned axis followed by a sliding in a direction parallel to said disc.

2. A disc brake for a vehicle which comprises, in combination, a disc rotatable about an axis perpendicular thereto and passing through the center thereof, a stationary brake frame disposed astride a portion of the periphery of said disc, two friction members parallel to said disc and located on opposed sides thereof opposite each other, said friction members being carried by said brake frame slidably with respect thereto parallelly to said axis, said frame and said friction members being mounted so as to permit movements of said friction members toward each other parallel to said axis, to clamp said disc tightly between them, each of said friction members including two cylindrical bearing surfaces the generatrices of which are parallel to said axis and the respective directrices of which are circular arcs having a common center and transverse to the periphery of said disc, said frame including cylindrical holding surfaces of the same shape as said bearing surfaces, respectively, and adapted to cooperate therewith, said frame further including at least one retractable abutment adapted to prevent pivoting of said friction members about an axis parallel to said disc axis and passing through said last mentioned center, in such manner that, once said abutment is retracted, said friction members can be disengaged from said frame by a pivoting about said second mentioned axis followed by a sliding in a direction parallel to the periphery of said disc.

3. A disc brake according to claim 1 wherein a line passing through the center of each of said friction members and perpendicular to the radius of said disc passing through said last mentioned center passes at most at a small distance from the common center of said two directrices.

4. A disc brake for a vehicle which comprises, in combination, a disc rotatable about an axis perpendicular thereto and passing through the center thereof, a stationary brake frame disposed astride a portion of the periphery of said disc, two friction members parallel to said disc and located on opposed sides thereof opposite each other, said friction members being carried by said brake frame slidably with respect thereto parallelly to said axis, said frame and said friction members being mounted so as to permit movements of said friction members toward each other parallel to said axis, to clamp said disc tightly between them, each of said friction members including two cylindrical bearing surfaces the generatrices of which are parallel to said axis and the respective directrices of which are circular arcs having a common center and transverse to the periphery of said disc, the first of said circular arcs extending on both sides of the plane, parallel to the axis of said disc, perpendicular to the radial plane of said disc passing through the centers of said friction members and which passes through said last mentioned centers and the second of said circular arcs being located wholly on one side of said plane, said frame including cylindrical holding surfaces of the same shape as said bearing surfaces, respectively, and adapted to cooperate therewith, said frame further including, opposite that of said holding surfaces located wholly on one side of said plane and on the other side of said plane, at least one retractable abutment adapted to prevent pivoting of said friction members about an axis parallel to said disc axis and passing through said last mentioned center, in such manner that, once said abutment is retracted said friction members can be disengaged from said frame by a pivoting about said last mentioned axis followed by a sliding in a direction parallel to the periphery of said disc.

5. A disc brake according to claim 4 wherein said abutment is located on the same side of said plane as said disc axis.

6. A disc brake according to claim 4 wherein the end of said friction members corresponding to said first mentioned circular arc is located to cooperate with the end of said stationary brake frame which receives the braking reactions when the vehicle is running forward.

References Cited by the Examiner

UNITED STATES PATENTS

| 2,790,516 | 4/1957 | Wright et al. | 188—73 |
| 3,051,272 | 8/1962 | Burnett | 188—73 |

FOREIGN PATENTS

| 867,785 | 5/1961 | Great Britain. |
| 935,995 | 9/1963 | Great Britain. |

MILTON BUCHLER, *Primary Examiner.*

G. E. A. HALVOSA, *Assistant Examiner.*